US012580002B2

(12) United States Patent (10) Patent No.: US 12,580,002 B2
Zhang et al. (45) Date of Patent: Mar. 17, 2026

(54) GOOF REPAIR IN MOVIES BASED ON LARGE LANGUAGE MODELS (LLMS)

(71) Applicant: International Business Machines Corporation, Armonk, NY (US)

(72) Inventors: Jing Zhang, Shanghai (CN); Shi Yun Liang, Shanghai (CN); Yuan Yuan Ding, Shanghai (CN); Yu Pan, Shanghai (CN); Jie Ting Chen, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/830,639

(22) Filed: Sep. 11, 2024

(65) Prior Publication Data

US 2026/0073946 A1     Mar. 12, 2026

(51) Int. Cl.
*G11B 27/036* (2006.01)
*G06F 40/40* (2020.01)

(52) U.S. Cl.
CPC ............ *G11B 27/036* (2013.01); *G06F 40/40* (2020.01)

(58) Field of Classification Search
CPC .............................. G11B 27/036; G06F 40/40
See application file for complete search history.

(56) References Cited

U.S. PATENT DOCUMENTS

| | | | |
|---|---|---|---|
| 11,978,271 B1 | 5/2024 | Kharbanda et al. | |
| 2021/0082469 A1 | 3/2021 | Rakshit et al. | |
| 2021/0097291 A1 | 4/2021 | Kosiakova et al. | |
| 2021/0134327 A1 | 5/2021 | Ratias | |

FOREIGN PATENT DOCUMENTS

| | | | | |
|---|---|---|---|---|
| CN | 108269271 A | | 7/2018 | |
| CN | 117576678 A | * | 2/2024 | .......... G06V 20/635 |
| CN | 118194923 A | | 6/2024 | |

OTHER PUBLICATIONS

Islam et al. "Efficient Movie Scene Detection using State-Space Transformers", arXiv:2212.14427, Jun. 21, 2023, 10 pages.
Lin et al. "VideoDirectorGPT: Consistent Multi-scene Video Generation via LLM-Guided Planning", UNC Chapel Hill, Sep. 26, 2023, 25 pages.

(Continued)

*Primary Examiner* — Mishawn N. Hunter
(74) *Attorney, Agent, or Firm* — Jordan T. Schiller

(57) ABSTRACT

A method for automatic detection and correction of continuity errors in video scenes. The method includes generating a textual representation of one or more visual scenes in a video using image caption technology and comparing the textual representation of the one or more visual scenes with embedded contextual information of the video. The method further includes identifying one or more inconsistency errors between the textual representation of one or more visual scenes and the embedded contextual information of the video. The method further includes proposing alternative text to reconcile the one or more inconsistency errors using a pre-trained large language model and employing the proposed alternative text to guide image replacement in the one or more visual scenes containing the one or more inconsistency errors.

20 Claims, 3 Drawing Sheets

(56)               References Cited

OTHER PUBLICATIONS

Pickup et al. "Automatic retrieval of visual continuity errors in movies", CIVR '09: Proceedings of the ACM International Conference on Image and Video Retrieval, Jul. 8, 2009, pp. 1-8, Article No. 7, https://doi.org/10.1145/1646396.1646406.
International Searching Authority, "Notification of Transmittal of the International Search Report and the Written Opinion of the International Searching Authority, or Declaration," Patent Cooperation Treaty, Jan. 19, 2026, 07 pages, International Application No. PCT/IB2025/058381.

* cited by examiner

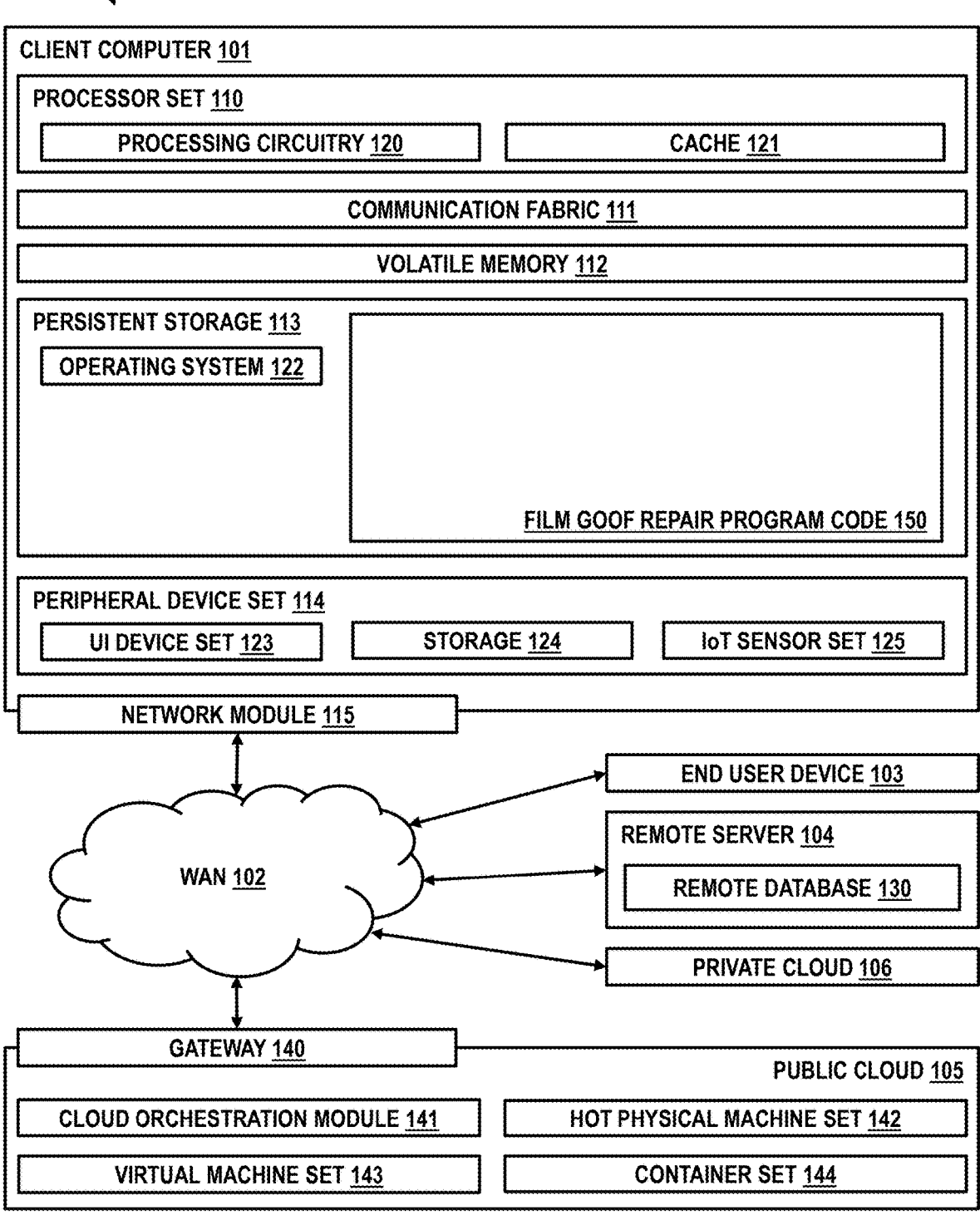

100

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

FILM GOOF REPAIR PROGRAM CODE 150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOT PHYSICAL MACHINE SET 142

VIRTUAL MACHINE SET 143          CONTAINER SET 144

GOOF REPAIR IN MOVIES BASED ON LARGE LANGUAGE MODELS (LLMS)

BACKGROUND

The present disclosure relates generally to the field of cognitive computing and more particularly to data processing and large language models.

Goof errors generally refer to scenes, images, or objects within completed films and television shows that do not align with the established background settings. This may include instances of inconsistency between two consecutive video segments, such as significant differences in makeup or hairstyle.

Goof errors in film and television shows could often spark discussion once they are broadcast. Some common examples of goof errors include anachronistic elements like airplanes, telephone poles, tires, plastic bags, logos, as well as on-set production equipment such as cameras, microphones, cameramen, and bystanders.

These errors may diminish the artistic quality of films and television shows, and in more serious cases, the recurrent low-grade goof errors may adversely affect a production's reputation and viewership ratings.

BRIEF SUMMARY

Embodiments of the present invention disclose a method, a computer program product, and a system.

According to an embodiment, a method, in a data processing system including a processor and a memory, for automatic detection and correction of continuity errors in video scenes. The method includes generating a textual representation of one or more visual scenes in a video using image caption technology and comparing the textual representation of the one or more visual scenes with embedded contextual information of the video. The method further includes identifying one or more inconsistency errors between the textual representation of one or more visual scenes and the embedded contextual information of the video. The method further includes proposing alternative text to reconcile the one or more inconsistency errors using a pre-trained large language model and employing the proposed alternative text to guide image replacement in the one or more visual scenes containing the one or more inconsistency errors.

A computer program product, according to an embodiment of the invention, includes a non-transitory tangible storage device having program code embodied therewith. The program code is executable by a processor of a computer to perform a method. The method includes generating a textual representation of one or more visual scenes in a video using image caption technology and comparing the textual representation of the one or more visual scenes with embedded contextual information of the video. The method further includes identifying one or more inconsistency errors between the textual representation of one or more visual scenes and the embedded contextual information of the video. The method further includes proposing alternative text to reconcile the one or more inconsistency errors using a pre-trained large language model and employing the proposed alternative text to guide image replacement in the one or more visual scenes containing the one or more inconsistency errors.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method includes generating a textual representation of one or more visual scenes in a video using image caption technology and comparing the textual representation of the one or more visual scenes with embedded contextual information of the video. The method further includes identifying one or more inconsistency errors between the textual representation of one or more visual scenes and the embedded contextual information of the video. The method further includes proposing alternative text to reconcile the one or more inconsistency errors using a pre-trained large language model and employing the proposed alternative text to guide image replacement in the one or more visual scenes containing the one or more inconsistency errors.

BRIEF DESCRIPTION OF THE DRAWINGS

FIG. 1 depicts a diagram graphically illustrating the hardware components of computing environment 100 and a cloud computing environment, in accordance with an embodiment of the present invention.

DETAILED DESCRIPTION

Figure 2:
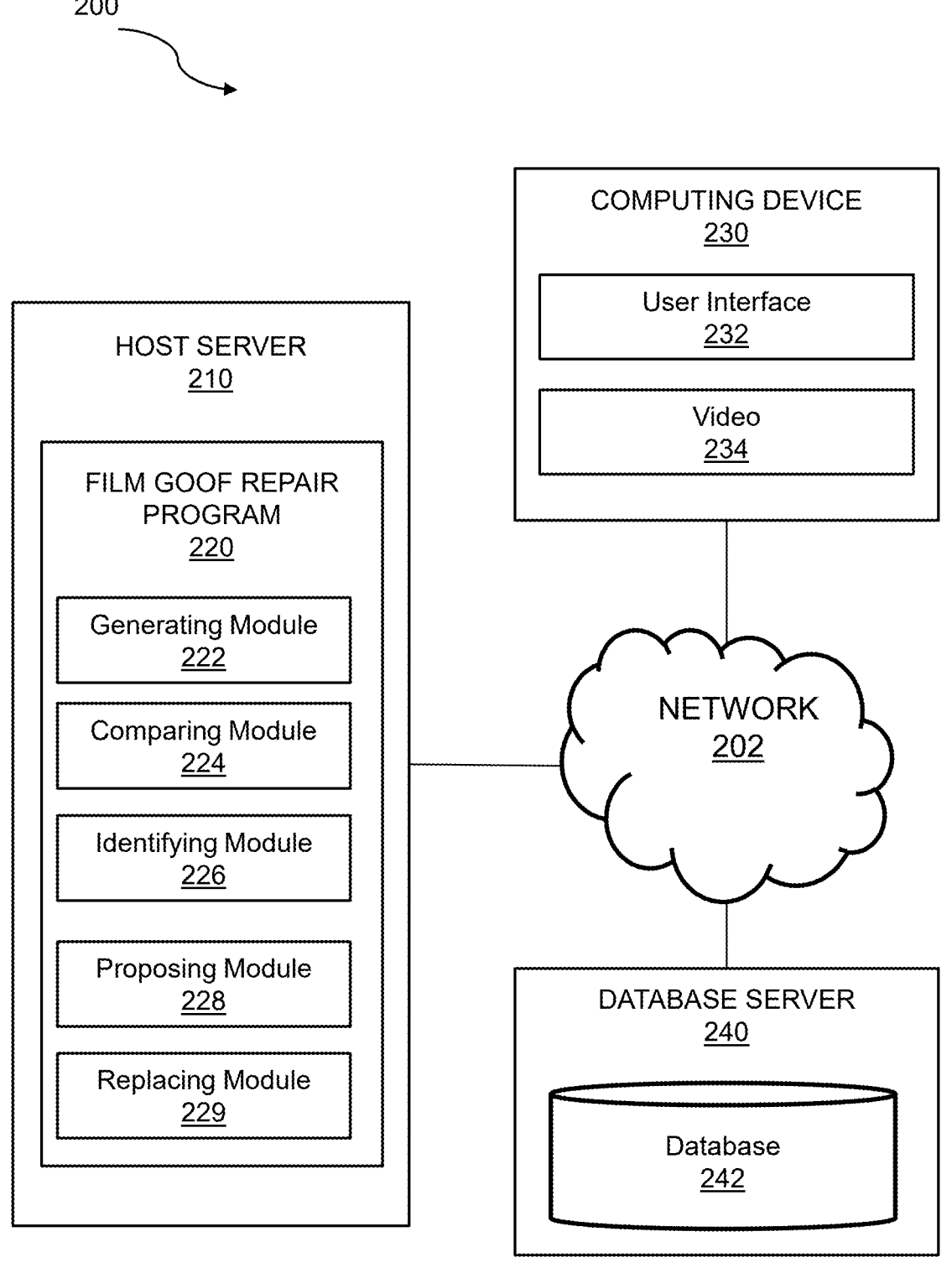
FIG. 2 illustrates film goof repair computing environment 200, in accordance with an embodiment of the present invention.

The occurrence of goof errors, such as anachronistic elements and inconsistencies, in completed films and television shows disrupts the immersion and artistic quality of the film content. These errors can lead to negative discussions and potentially harm the reputation and viewership ratings of film productions.

Current solutions may entail having on-site production assistants inspect the film set to eliminate some of the modern elements. Alternatively, after filming is complete, image editors can manually inspect each frame and perform repairs. These solutions are time consuming, inefficient, and prone to human error.

The present invention proposes a method for automatic detection and correction of continuity errors in scenes based on a large language model. This approach utilizes the capabilities of a large language model to analyze and identify continuity errors in video frames or images, followed by applying corrections to the detected issues.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 depicts a diagram graphically illustrating the hardware components of computing environment 100 and a cloud computing environment in accordance with an embodiment of the present invention.

Computing environment 100 contains an example of an environment for the execution of at least some of the computer code involved in performing the inventive methods, such as film goof repair program code 150. In addition to the film goof repair program code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and film goof repair program code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in film goof repair program code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open-source Portable Operating System Interface type operating systems that employ a kernel. The code included in film goof repair program code 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 illustrates film goof repair computing environment 200, in accordance with an embodiment of the present invention. Film goof repair computing environment 200 includes host server 210, computing device 230, and database server 240, all connected via network 202. The setup in FIG. 2 represents an example embodiment configuration for the present invention and is not limited to the depicted setup to derive benefit from the present invention.

In an exemplary embodiment, host server 210 includes film goof repair program 220. In various embodiments, host server 210 may be a laptop computer, tablet computer, netbook computer, personal computer (PC), a desktop computer, a personal digital assistant (PDA), a smart phone, or any programmable electronic device capable of communicating with computing device 230, and database server 240, via network 202. Host server 210 may include internal and external hardware components, as depicted, and described in further detail with reference to FIG. 1. In other embodiments, host server 210 may be implemented in a cloud computing environment, as further described in relation to FIG. 1 herein. Host server 210 may also have wireless connectivity capabilities allowing it to communicate with computing device 230, and database server 240, and other computers or servers over network 202.

With continued reference to FIG. 2, computing device 230 includes user interface 232 and video 234 and may be a laptop computer, tablet computer, netbook computer, personal computer (PC), a desktop computer, a personal digital assistant (PDA), a smart phone, or any programmable electronic device capable of communicating with host server 210 and database server 240 via network 202. Computing device 230 may include internal and external hardware components, as depicted, and described in further detail with reference to FIG. 1. In other embodiments, computing device 230 may be implemented in a cloud computing environment, as described in relation to FIG. 1.

In exemplary embodiments, user interface 232 is a computer program which allows a user to interact with computing device 230 and other connected devices via network 202. For example, user interface 232 may be a graphical user interface (GUI). In addition to comprising a computer program, user interface 232 may be connectively coupled to hardware components, such as those depicted in FIG. 1, for receiving user input. In an exemplary embodiment, user interface 232 may be a web browser, however in other embodiments user interface 232 may be a different program capable of receiving user interaction and communicating with other devices.

In exemplary embodiments, video 234 may be a recorded film, television show, image, compilation of images, movie scene, and any other recording containing visual images subject to inconsistency errors.

With continued reference to FIG. 2, database server 240 comprises database 242 and may be a laptop computer, tablet computer, netbook computer, personal computer (PC), a desktop computer, a personal digital assistant (PDA), a smart phone, or any programmable electronic device capable of communicating with host server 210 and computing device 230 via network 202.

In exemplary embodiments, database 242 contains pre-edited and post-edited films, television shows, images, compilation of images, movie scenes, and so forth. In alternative embodiments, database 242 comprises video and images that are continuously edited and changed after using film goof repair program 220.

With continued reference to FIG. 2, host server 210 includes film goof repair program 220. Host server 210 may be a laptop computer, tablet computer, netbook computer, personal computer (PC), a desktop computer, a personal digital assistant (PDA), a smart phone, or any programmable electronic device capable of communicating with computing device 230, and database server 240 via network 202.

With continued reference to FIG. 2, film goof repair program 220, in an exemplary embodiment, may be a computer application on host server 210 that contains instruction sets, executable by a processor. The instruction sets may be described using a set of functional modules. In exemplary embodiments, film goof repair program 220 may receive input from computing device 230 and database server 240 over network 202. In alternative embodiments, film goof repair program 220 may be a computer application on computing device 230, or a standalone program on a separate electronic device.

The present invention proposes a technique for automatic detection and correction of continuity errors in video scenes based on large language models (LLM). This approach utilizes the capabilities of an LLM to analyze and identify continuity errors in video frames or images, followed by applying corrections to the detected issues. The entire process is divided into various modules.

In the specific domain of analyzing and improving scene descriptions in movies and television shows, LLMs play a transformative role. Their ability to comprehend intricate textual details while considering broader contextual factors makes them ideal candidates for assessing inconsistencies within scene descriptions. By drawing upon the background information like era, location, and storyline specifics, these LLMs can pinpoint text segments that deviate from logical coherence or contextual harmony.

The process begins with the pre-trained LLM ingesting the scene description and embedded contextual information of one or more scenes. Through its learned understanding of language patterns, semantics, and connections, the model can identify phrases or expressions that are inconsistent with the established narrative framework (i.e. storyline). For example, if a scene is set in a historical period but includes modern-day terminology in its description, the model can flag this inconsistency.

Moreover, the LLM's strength lies in its ability to not just identify problems but also to provide intelligent replacement suggestions. Drawing from its extensive exposure to diverse linguistic styles and vocabularies, the model can propose alternative phrasings that seamlessly fit within the defined temporal and spatial constraints. These suggestions serve as a bridge between textual descriptions and narrative context, ensuring that the audience is presented with a coherent and immersive experience.

The advantages of employing LLMs for this task are multifold. Their adaptability to various genres and narrative settings allows them to be applied to a wide spectrum of movies and television shows. The models' capacity to synthesize language akin to human expression contributes to generating replacement text that not only aligns contextually but also maintains the artistic and emotive essence of the original description.

With continued reference to FIG. 2, the functional modules of film goof repair program 220 include generating module 222, comparing module 224, identifying module 226, proposing module 228, and replacing module 229.

Figure 3:
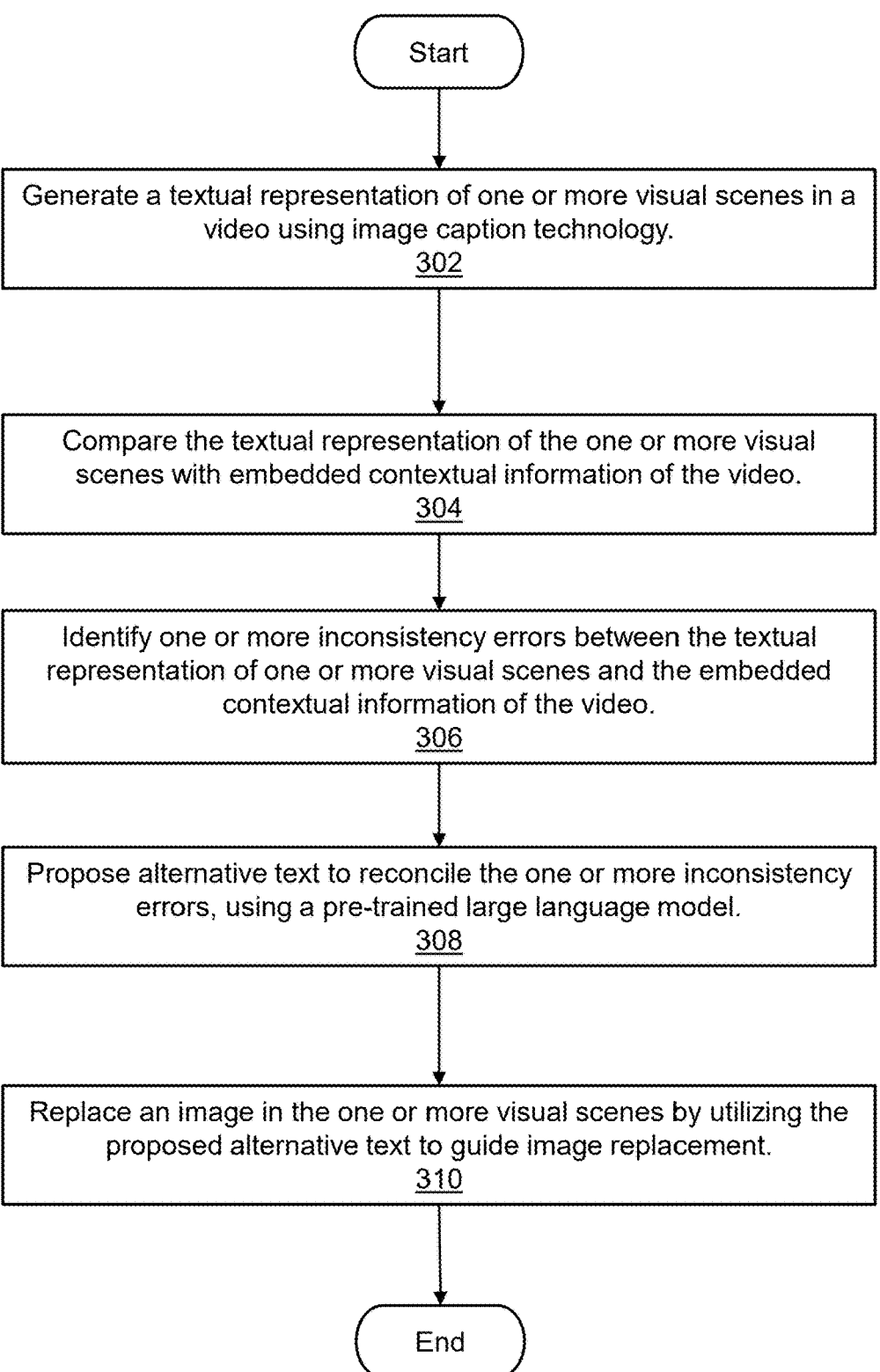
FIG. 3 is a flowchart illustrating the operation of film goof repair program 220 of FIG. 2, in accordance with an embodiment of the present invention.

FIG. 3 is a flowchart illustrating the operation of film goof repair program 220 of FIG. 2, in accordance with embodiments of the present disclosure.

With reference to FIGS. 2 and 3, generating module 222 includes a set of programming instructions, in film goof repair program 220, to generate a textual representation of one or more visual scenes in a video using image caption technology (step 302). The set of programming instructions is executable by a processor.

In exemplary embodiments, generating module 222 involves harnessing cutting-edge algorithms, particularly those related to image captioning, to automatically generate textual representations of visual scenes from movies and television shows.

In exemplary embodiments, generating module 222 leverages advanced models (e.g., BLIP-2 and ClipCap) that have been specifically designed to decode the visual elements of a scene and convert them into coherent and contextually relevant textual descriptions.

In alternative embodiments, generating module 222 may further enrich the scene descriptions by utilizing a strategy of amalgamation. Amalgamation entails combining outputs from different algorithms or models to craft more intricate and multifaceted descriptions that encompass a broader range of details. This approach adds layers of depth to the textual representations.

Capturing the background information of a movie or television show is an integral component of film goof repair 220. Beyond the scenes themselves, context is crucial in fully understanding the nuances of a movie or television show. By drawing from the background information embedded in the movie storyline, including the era and location where the narrative unfolds, a comprehensive backdrop description can be generated.

The supplementary background information helps set the stage for the various scenes, providing the LLM with a better grasp of the larger narrative context.

With reference to an illustrative example, a pirate movie includes a scene depicting a pirate in traditional pirate hat, clothes, and makeup. In the background of this particular scene depicting the traditional pirate, there is a modern-day man wearing a cowboy hat. Generating module 222 produces a textual representation of the scene as follows: "A man with flowing black hair cascading down his shoulders. He dons a large, wide-brimmed pirate hat. And behind him stands a man in a white T-shirt and a white cowboy hat." The embedded background information of the move describes that the movie is set around the $17^{th}$ century and takes place in the legendary Caribbean waters where pirates are most active.

With continued reference to FIGS. 2 and 3, comparing module 224 includes a set of programming instructions in film goof repair program 220, to compare the textual representation of the one or more visual scenes with embedded contextual information of the video (step 304). The set of programming instructions are executable by a processor.

In exemplary embodiments, comparing module 224 analyzes inconsistencies within the scene description based on the scene description text and contextual information such as the era and location set by the movie or television show's storyline.

With continued reference to FIGS. 2 and 3, identifying module 226 includes a set of programming instructions in film goof repair program 220, to identify one or more inconsistency errors between the textual representation of one or more visual scenes and the embedded contextual information of the video (step 306). The set of programming instructions are executable by a processor.

In exemplary embodiments, identifying module 226 identifies parts of the textual representation that might not align logically or contextually with the given background information.

With continued reference to the illustrative example, comparing module 224 analyzes inconsistent parts of the textual representation of the movie scene based on the embedded background, or storyline, of the movie. Identifying module 226 identifies the text "And behind him stands a man in a white T-shirt and a white cowboy hat" as being inconsistent and out of place in the context of the movie. The mention of a "white T-shirt" and "white cowboy hat" is an anachronism and does not fit the $17^{th}$ century Caribbean pirate setting.

With continued reference to FIGS. 2 and 3, proposing module 228 includes a set of programming instructions in film goof repair program 220, to propose alternative text to reconcile the one or more inconsistency errors using a pre-trained large language model (step 308). The set of programming instructions are executable by a processor.

In exemplary embodiments, proposing module 228 suggests text replacement that is congruent with the embedded storyline to enhance the overall coherence of the scene description.

With continued reference to the illustrative example, proposing module 228 suggests replacing the inconsistent text "And behind him stands a man in a white T-shirt and white cowboy hat" with "A weathered pirate companion standing by his side."

With continued reference to FIGS. 2 and 3, replacing module 229 includes a set of programming instructions in film goof repair program 220, to replace an image in the one or more visual scenes by utilizing the proposed alternative text to guide image replacement (step 310). The set of programming instructions are executable by a processor.

In exemplary embodiments, replacing module 229 aims to conduct image editing on the original image of the one or more visual scenes in the video, based on the generated textual representation and the proposed alternative text.

In exemplary embodiments, replacing module 229 substitutes incongruous areas in the original image, of the one or more visual scenes, with visual content that is congruent with the storyline of the video.

In exemplary embodiments, replacing module 229 is an editing model that encompasses the following inputs: the original image, the inconsistent text description from the original image, suggested text replacement, and a randomly sampled frame from within five frames preceding and following the current image. Ultimately, the output is the edited image, wherein the problematic region in the image is replaced and supplemented with appropriate content for the storyline.

In exemplary embodiments, the image editing process includes two steps. The first step entails adding noise (e.g., Gaussian noise) to the original image of the one or more visual scenes, one conditioned on the inconsistent text and another one conditioned on fused embeddings from images with an interval of five frames from the current frame and the replacement text.

In exemplary embodiments, a normalized difference is computed between the two images with added noise, and an output mask is derived for an edit region in the original image. For the fused embedding, a multimodal encoder and cross attention module is used to get the text-visual fusion. Using the fused embedding rather than the text embedding enables the model to generate an image that aligns better with the current video style when editing and modifying specific regions.

In exemplary embodiments, the second step entails performing a denoising diffusion implicit model (DDIM) encoding process to estimate a latency of an input image. Subsequently, replacing module 229 applies a DDIM decoding procedure condition on the fused embedding, with the guidance of the mask output from step 1, to generate the edited image.

In exemplary embodiments, replacing module 229 enhances source images by adding noise based on the inconsistent text and fused embeddings from previous frames. The resulting images are compared to derive an edit region mask, guiding further refinement through DDIM encoding and decoding procedures.

With continued reference to the illustrative example, the location in the image of the "man in a white T-shirt and white cowboy hat" is identified and replaced with "A weathered pirate companion standing by his side", related to the storyline's era background.

The invention utilizes LLMs to find mistakes in movie scenes and automatically replace the image mistakes with congruous images.

In exemplary embodiments, network 202 is a communication channel capable of transferring data between connected devices and may be a telecommunications network used to facilitate telephone calls between two or more parties comprising a landline network, a wireless network, a closed network, a satellite network, or any combination thereof. In another embodiment, network 202 may be the Internet, representing a worldwide collection of networks and gateways to support communications between devices connected to the Internet. In this other embodiment, network 202 may include, for example, wired, wireless, or fiber optic connections which may be implemented as an intranet network, a local area network (LAN), a wide area network (WAN), or any combination thereof. In general, network 202 can be any combination of connections and protocols that will support communications between host server 210, computing device 230, and database server 240.

What is claimed is:

1. A computer-implemented method comprising:
one or more computer devices each having one or more processors and one or more tangible storage devices;
generating, using the one or more computer devices, a textual representation of one or more visual scenes in a video using image caption technology;
comparing, using the one or more computer devices, the textual representation of the one or more visual scenes with embedded contextual information of the video;
identifying, using the one or more computer devices, one or more inconsistency errors between the textual representation of one or more visual scenes and the embedded contextual information of the video;
proposing, using the one or more computer devices, alternative text to reconcile the one or more inconsistency errors, using a pre-trained large language model; and
replacing, using the one or more computer devices, an image in the one or more visual scenes by utilizing the proposed alternative text to guide image replacement.

2. The computer-implemented method of claim 1, wherein the embedded contextual information of the video comprises a storyline, an era, and a location where the storyline unfolds.

3. The computer-implemented method of claim 2, further comprising:
ingesting a scene description and the embedded contextual information of the scene by the pre-trained large language model;
identifying one or more phrases or expressions that are inconsistent with the storyline; and
flagging parts of the scene description that do not align logically or contextually with the embedded contextual information of the storyline.

4. The computer-implemented method of claim 1, further comprising:
conducting image editing on an original image of the one or more visual scenes in the video, based on the generated textual representation and the proposed alternative text.

5. The computer-implemented method of claim 4, wherein image editing comprises:
substituting incongruous areas in the original image of the one or more visual scenes with visual content that is congruent with a storyline of the video.

6. The computer-implemented method of claim 5, further comprising:
adding noise to the original image of the one or more visual scenes, wherein a first noise is conditioned on the one or more inconsistency errors and a second noise is conditioned on fused embeddings from images with an interval of five frames from a current frame and the replacement text;
computing a normalized difference between the first noise and the second noise; and
deriving a mask output for an edit region in the original image.

7. The computer-implemented method of claim 6, further comprising:
performing a diffusion implicit models (DDIM) encoding process to estimate a latency of an input image;
applying DDIM decoding process on the fused embedding; and generating an edited image, with assisted guidance of the mask output.

8. A computer program product, comprising a tangible storage device having program code embodied therewith, the program code executable by a processor of a computer to perform a method, the method comprising:

generating, following instructions via the program code executable by the processor of the computer, a textual representation of one or more visual scenes in a video using image caption technology;

comparing, following instructions via the program code executable by the processor of the computer, the textual representation of the one or more visual scenes with embedded contextual information of the video;

identifying, following instructions via the program code executable by the processor of the computer, one or more inconsistency errors between the textual representation of one or more visual scenes and the embedded contextual information of the video;

proposing, following instructions via the program code executable by the processor of the computer, alternative text to reconcile the one or more inconsistency errors, using a pre-trained large language model; and replacing, following instructions via the program code executable by the processor of the computer, an image in the one or more visual scenes by utilizing the proposed alternative text to guide image replacement.

9. The computer program product of claim 8, wherein the embedded contextual information of the video comprises a storyline, an era, and a location where the storyline unfolds.

10. The computer program product of claim 9, further comprising:

ingesting a scene description and the embedded contextual information of the scene by the pre-trained large language model;

identifying one or more phrases or expressions that are inconsistent with the storyline; and flagging parts of the scene description that do not align logically or contextually with the embedded contextual information of the storyline.

11. The computer program product of claim 8, further comprising:

conducting image editing on an original image of the one or more visual scenes in the video, based on the generated textual representation and the proposed alternative text.

12. The computer program product of claim 11, wherein image editing comprises:

substituting incongruous areas in the original image of the one or more visual scenes with visual content that is congruent with a storyline of the video.

13. The computer program product of claim 12, further comprising:

adding noise to the original image of the one or more visual scenes, wherein a first noise is conditioned on the one or more inconsistency errors and a second noise is conditioned on fused embeddings from images with an interval of five frames from a current frame and the replacement text;

computing a normalized difference between the first noise and the second noise; and deriving a mask output for an edit region in the original image.

14. The computer program product of claim 13, further comprising:

performing a diffusion implicit models (DDIM) encoding process to estimate a latency of an input image;

applying DDIM decoding process on the fused embedding; and generating an edited image, with assisted guidance of the mask output.

15. A computer system, comprising:

one or more computer devices each having one or more processors and one or more tangible storage devices; and a program embodied on at least one of the one or more storage devices, the program having a plurality of program instructions for execution by the one or more processors, the program instructions comprising instructions for:

generating, following the plurality of program instructions, a textual representation of one or more visual scenes in a video using image caption technology;

comparing, following the plurality of program instructions, the textual representation of the one or more visual scenes with embedded contextual information of the video;

identifying, following the plurality of program instructions, one or more inconsistency errors between the textual representation of one or more visual scenes and the embedded contextual information of the video;

proposing, following the plurality of program instructions, alternative text to reconcile the one or more inconsistency errors, using a pre-trained large language model; and replacing, following the plurality of program instructions, an image in the one or more visual scenes by utilizing the proposed alternative text to guide image replacement.

16. The computer system of claim 15, wherein the embedded contextual information of the video comprises a storyline, an era, and a location where the storyline unfolds.

17. The computer system of claim 16, further comprising:

ingesting a scene description and the embedded contextual information of the scene by the pre-trained large language model;

identifying one or more phrases or expressions that are inconsistent with the storyline; and flagging parts of the scene description that do not align logically or contextually with the embedded contextual information of the storyline.

18. The computer system of claim 15, further comprising:

conducting image editing on an original image of the one or more visual scenes in the video, based on the generated textual representation and the proposed alternative text.

19. The computer system of claim 18, wherein image editing comprises:

substituting incongruous areas in the original image of the one or more visual scenes with visual content that is congruent with a storyline of the video.

20. The computer system of claim 19, further comprising:

adding noise to the original image of the one or more visual scenes, wherein a first noise is conditioned on the one or more inconsistency errors and a second noise is conditioned on fused embeddings from images with an interval of five frames from a current frame and the replacement text;

computing a normalized difference between the first noise and the second noise; and deriving a mask output for an edit region in the original
image.

* * * * *